United States Patent [19]
Dix

[11] 3,965,683
[45] June 29, 1976

[54] SOLAR ELECTRICAL GENERATING SYSTEM

[76] Inventor: Sydney Dix, 48 The Point, Coronado, Calif. 92118

[22] Filed: May 9, 1974

[21] Appl. No.: 468,399

[52] U.S. Cl. ................................. 60/641; 60/659; 126/271; 350/179; 350/253
[51] Int. Cl.² .................... F03G 7/02; G02B 1/06
[58] Field of Search ............. 60/641, 659; 126/271, 126/270; 350/179, 180, 253

[56] References Cited
UNITED STATES PATENTS

| | | | |
|---|---|---|---|
| 504,890 | 9/1893 | Ohmart | 350/180 |
| 757,900 | 4/1904 | Englund | 350/179 |
| 1,269,422 | 6/1918 | Gordon | 350/180 |
| 1,599,481 | 9/1926 | Marcuse | 126/271 |
| 1,683,266 | 9/1928 | Shipman | 126/271 |
| 2,259,902 | 10/1941 | McCain | 126/271 |
| 2,490,873 | 12/1949 | Johnson | 350/179 |
| 2,920,710 | 1/1960 | Howard | 60/641 |
| 2,933,885 | 4/1960 | Benedek et al. | 60/659 |

*Primary Examiner*—Allen M. Ostrager
*Attorney, Agent, or Firm*—George F. Smyth

[57] ABSTRACT

A lens is used to concentrate solar rays to heat an expansible fluid. Energy is extracted from the fluid to drive an electric current generator. The heated fluid may first pass through a heat sink to provide a more continuous flow of heated fluid to the current generating system. The lens itself may be biconvex and comprise two or more plates. If desired, the volume between the plates may be filled with a fluid, preferably having the same index of refraction as the material of the plates. Suitable apparatus may be provided to control the aximuth and bearing of the lens so that it is always situated as nearly as possible between the sun and the fluid container.

14 Claims, 3 Drawing Figures

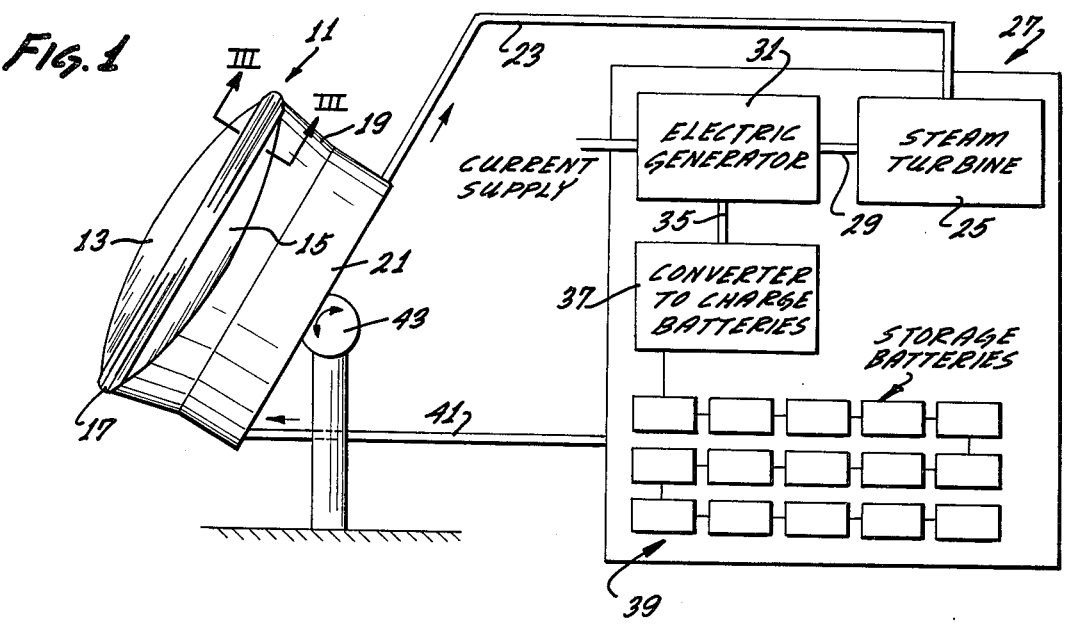
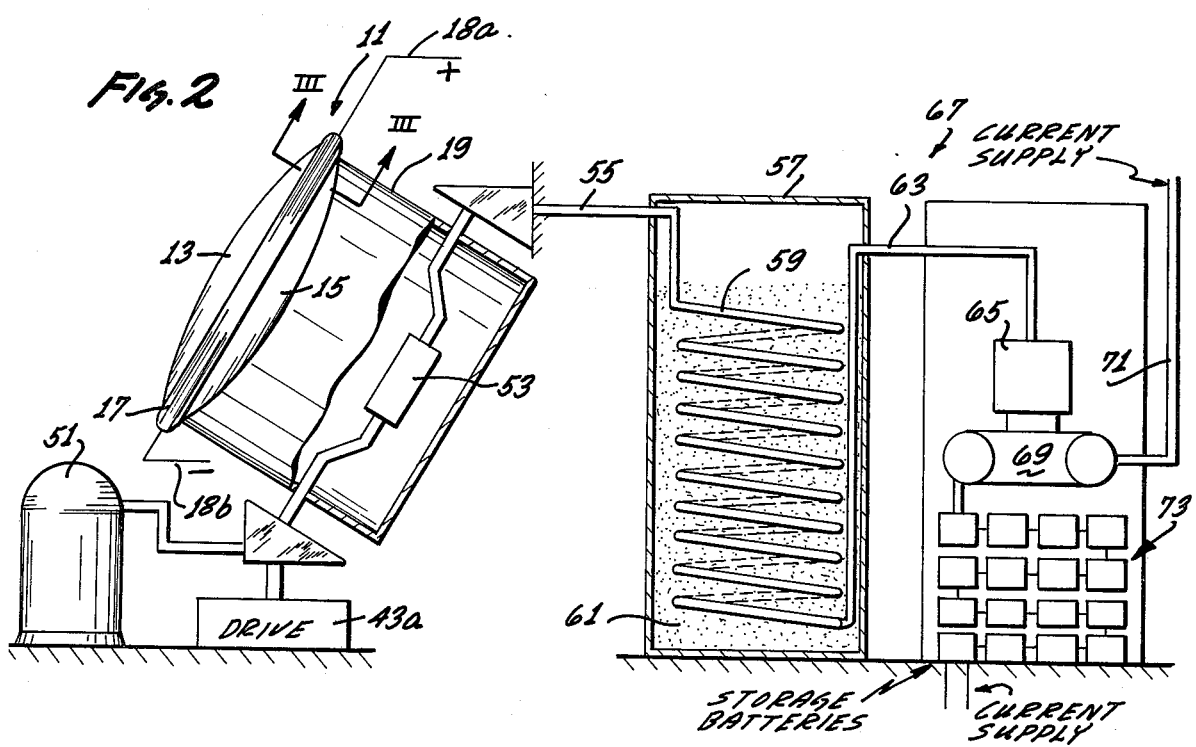
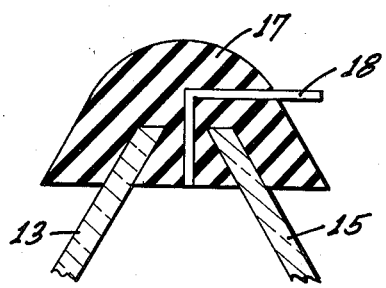

SOLAR ELECTRICAL GENERATING SYSTEM

BACKGROUND OF THE INVENTION

The recent energy crisis has clearly illustrated the need for additional sources of energy if a desirable standard of living is to be maintained. It is well known that the use of petroleum products to heat and light homes, to drive automobiles, etc., can be continued only for a finite period of time before the supply of those products is completely exhausted. Consequently, a great number of projects have been undertaken to develop additional or alternate sources of power.

It is also well known that the use of petroleum-based products to fulfill energy needs is not only wasteful of those products but also detrimental to ecological considerations due to smog and other pollution their use creates. Thus, not only is it necessary and desirable to produce and utilize other sources of energy, but it is also necessary that those additional energy sources be inexpensive and as pollution free as possible.

In many cases, large energy producers such as utility companies have been turning to nuclear power. While this alternative may be satisfactory in the case of production of massive quantities of electricity, it is presently unsuitable for small applications due to the fact that such power plants are very expensive and, at a minimum, waste a great deal of heat.

When attempting to provide an alternative power source for much smaller applications, such as a single building or home, an automobile, etc., there have been no satisfactory developments which are sufficiently reliable, low cost, and low pollution output.

In many instances, developers of such systems have attempted to accomplish the desired results by capturing and utilizing solar energy, but the systems designed have been expensive, complex, and often unsuitable for small applications. For example, most of the systems designed thus far require the use of large solar panels which must be spread out in a field or on a roof top. They often require that the building with which they are to be used be constructed specifically so as to utilize the system.

To date, no relatively small, unobstrusive, inexpensive, and pollution free alternative for the generation of power and heat has yet been devised.

SUMMARY OF THE INVENTION

The present invention relates to a solar driven power source which is completely pollution free, inexpensive, and very simple in its operation and maintenance.

The invention proposed here utilizes a lens for the concentration of solar infra-red rays upon a container carrying a fluid which is to be heated by those rays. The heated fluid may then be directed to a power generation or energy conversion apparatus which develops an electrical current which may be delivered directly to the using apparatus or to a bank of batteries or other power cells for storage until such time as the electrical energy is needed.

The lens may be biconvex; if desired, it may be formed by two or more inexpensively sag-formed circular glass plates, between which is confined a fluid having substantially the same index of refraction as the plates. Also, if desired, a flexible extrusion or other type of device may encircle the periphery of the plates and be provided with structure so that the plates may be captured therein; this element may be used to allow for expansion and contraction of the lens as it is heated by the sun and cooled at night. In other words, it may serve as an expansion joint. Further, if desired, the pressure of the fluid within the lens, and its chemical composition, may also be controlled and altered.

In one embodiment of the invention, the solar rays may be concentrated onto a boiler which heats a fluid, such as water, until it becomes steam. The steam may be passed through a turbine which drives a generator.

In an alternate embodiment of the invention, the fluid heated by the solar rays may be either liquid or gas. After it is heated, it may be passed through an eutectic material which will serve as a latent heat storage unit or heat sink. The heat in the fluid will melt the metal and raise its temperature until it is substantially equal to that of the heated fluid as it passes through the eutectic. The fluid may then continue on to a current generation device which it can drive either through expansion or merely as a result of fluid flow.

When the sun's rays provide less heat to the fluid as a result of its position relative to the surface of the earth, the latent heat stored in the eutectic may be transferred back to the fluid, and, depending upon the quantity of the eutectic, can be used to drive the generator for several hours after the sun has set.

In either case, or in any other embodiment of the invention, the current generating device can be connected to an electrical circuit so that any excess current which it is generating can be stored in a bank of storage batteries or other power cells until needed.

Thus, the present invention comprises a relatively simple device which can be produced in any desirable size so as to provide heating, cooling, and electrical power to a home, a large building, or even to a vehicle. Although the invention will be illustrated with respect to different embodiments, those skilled in the art, upon review of the following detailed description and the drawings, will quickly become aware of the fact that there are innumerable embodiments in which the invention may be employed, many of which will become immediately apparent. In any event, it should be realized that the scope of the invention is not limited to the described embodiments, but to whatever may be fairly covered by the claims.

DESCRIPTION OF THE DRAWING

FIG. 1 comprises a schematic illustration of a first embodiment of a solar generator apparatus employing the invention;

FIG. 2 comprises a schematic illustration of a second embodiment of structure which may employ the invention; and FIG. 3 comprises a partial sectional view of one embodiment of a lens which may be employed with the present invention, as seen along a line III—III in either FIG. 1 or FIG. 2.

DETAILED DESCRIPTION

Referring now to the drawings in greater detail, and specifically to the lens structure shown in FIGS. 1-3, there is illustrated an exemplary lens 11 which may comprise at least two plates or lens faces 13, 15. The plates may be formed in any suitable manner and of any suitable material. However, as presently envisioned, it might be preferable to form the plates from flat sheets of glass which are heated and then allowed to sag into a mold of suitable configuration. In any event, it will often be preferred that the lens plates be of circular configuration and the lens be biconvex so as to provide the most efficient transmission and concentration of solar waves which pass through the lens.

As shown particulary in FIG. 3, a flexible element or expansion-joint member 17 may be formed, for example, as an extrusion, and utilized to join the plates 13 and 15 about the peripheries thereof and hold the plates in relationship to one another. If the element 17 is provided so as to be of flexible material, heating and cooling of the lens as it undergoes daily solar cycles can be easily and rapidly absorbed in the expansion joint 17, thus preventing damage to the lens and allowing efficient operation thereof.

In many cases, it will be desirable to improve the efficiency of the lens by manufacturing it in such a way that it is either a solid piece of glass or, at least, substantially simulates such a solid piece of glass. In an embodiment which is usually less expensive than a solid piece of glass, a liquid filler may be installed between the plates 13 and 15. Preferably, the index of refraction of the liquid filler should be equal to or about the same as that of the material of the lens plates so as to substantially eliminate reflection of solar waves as they pass through the various materials of the lens.

Of course, it will be realized by those skilled in the art that the lens could be manufactured utilizing more than two plates and, in fact, a series of lenses could be provided to increase the efficiency of the device. Also, in the abovedescribed embodiment, it would be possible, if desirable, to install one or more ports 18 through the expansion joint 17 so that fluids may be added to or removed from the space between the plates in order, for example, to adjust the focal length or index of refraction of the lens. Similarly, if desired, a cathode and anode 18$a$ and 18$b$ may be installed in the volume between the plates so as to allow selective electrical current excitation of the lens filler in order to eliminate or generate various chemical elements in the filler to alter the operation of the lens.

In any event, it can be seen by those skilled in the art that a lens which may be utilized in accordance with the present invention may be provided with as simple or as complex structure as may be desired for the application involved.

With respect now to FIG. 1, it can be seen that the lens 11 may be situated in a gimbal housing 19, at the rear of which may be located a boiler or other heat exchanger 21. Thus, the solar rays passing through the lens can be directed onto the boiler 21 in order to heat a fluid, such as water, therein. Suitable concentration of solar rays onto the boiler 21 will cause water or other fluid therein to be boiled into a steam or high temperature fluid which may be transmitted via a pipe or similar apparatus 23 to a current generating unit; between the sentences insert 27. The fluid may then enter a turbine 25. As the fluid expands in the turbine 25, the turbine may be rotated, thus extracting useful energy from the fluid. The turbine, in turn, can be connected via a shaft or other apparatus 29 to drive an electric generator 31.

Current from the generator 31 may be directed through a line 33 directly to an apparatus to be electrically powered or, alternatively (and additionally) through a line 35 to a converter 37 to store the energy as an electrical potential in a bank of storage batteries 39. Thus, if the power drain on the system is equal to that which the generator is capable of generating, the current passing through the line 33 will be all which the generator can generate and no current will be transmitted to the converter 37. When the power demand is lower, the excess current generated can be delivered to the battery charger 37, and into the batteries 39.

On the other hand, when the power demand is greater than that which can be supplied by the generator, the battery potential may be used to supplement or replace it altogether. Also, when the sun has set and no additional heating of the fluid in the boiler 21 is possible, the batteries 39 can be utilized for a period of time, determined by their capacity and their number, to provide electrical power.

As energy is extracted from the fluid, for example by expansion of steam in the turbine 25, the steam may be condensed back into water and then returned, via a pipeline or similar apparatus 41 to the boiler 21.

It will often be desirable to insure that the lens 11 is situated directly between the sun and the boiler 21 at all times. This will provide the most efficient use of the solar rays. To accomplish this, a drive apparatus 43, including a timer, a suitable light-actuated solenoid, or a similar apparatus, may be utilized to adjust the azimuth and bearing of the gimbal 19 to properly locate the lens. Thus, it can be seen that the present invention may be employed in relatively simple apparatus of very low complexity, also, it may be adjusted in size in accordance with the task to be accomplished. For example, the device could be manufactured of such a size that it could be used to power either an automobile or a very large building. Similarly, a bank of lenses and heat exchangers may be provided to eliminate the requirement for one large lens which may be too expensive.

Referring now to the embodiment of FIG. 2, it will be realized by those skilled in the art that, if desired, water could be utilized to generate steam in the manner described with respect to FIG. 1. For the sake of illustration, however, it will be assumed that this embodiment includes a source 51 of pressurized fluid such as air, water, etc., which may be passed through a heat exchanger 53 at the rear of the gimbal housing 19, wherein it is heated by the solar rays passing through the lens 11.

Although the gimbal housing 19 may be mounted in any suitable manner, there has been illustrated a drive apparatus 43$a$ which may be utilized so as to maintain the most efficient location of the lens 11 relative to the sun. In any event, as the heated air or other fluid, whether gas or liquid, passes from the heat exchanger 53, it may be delivered, via a pipe 55, to a latent heat storage unit or heat sink 57 and passed through a series of coils 59 in the storage unit.

In order to increase the length of time at the end of the day during which this apparatus may be used, an eutectic material may be placed within the chamber 61 in the heat storage unit 57. As the heated fluid passes through the coils 59, it will melt and heat the eutectic until the latter reaches a temperature substantially equal to that of the heated fluid. The fluid will also pass through a line 63 to an energy extraction device 65, such as a turbine, in the current generating unit 67. The device 65 may be of any suitable type such as expansion or pressure flow driven but, in any event, may be positioned so as to drive a generator 69 which can deliver electrical energy either or both to a line 71 or a bank of storage batteries 73. Thus, the electrical energy may be employed in the manner described with respect to the embodiment of FIG. 1.

The heated fluid may then be exhausted to the atmosphere, or, if desired, may be returned to the reservoir 51.

When the sun's rays are no longer powerful enough to provide sufficient heat to the heat exchanger 53, the latent heat which has been stored in the heat sink 57 will then continue to heat the fluid passing through the coils 59 for a period of time which can be determined from parameters relating to the materials used for the fluid and the eutectic.

If it is desired to utilize this system continuously, it will be realized by those skilled in the art that suitable burners or similar devices could be located relative to the heat sink 57 to continue heating the eutectic and maintain it at a temperature suitable for heating the fluid passing through the coils until such time as the sun enters its next cycle and again heats the fluid in the heat exchanger 53.

Thus, there has been disclosed two embodiments of relatively simple structure which may employ this invention. These embodiments are not, in themselves, the invention; rather, the invention is of a much broader scope, comprising a concept which may be employed in many combinations of structure. The invention itself is limited only by the scope of the following claims.

I claim:
1. Apparatus for generating electrical current including
    means for capturing solar rays comprising
        a lens having
            a pair of plates having a volume enclosed therebetween,
            sealing means located about the periphery of said plates to seal the volume therebetween while permitting diametrical expansion and contraction of said plates as they are heated and cooled by the sun, while maintaining the focal length of said lens substantially constant,
            liquid means within said volume having substantially the same index of refraction as the material of said plates, and
            means for increasing and decreasing the amount of said liquid means in the volume between said plates,
    means for controlling the azimuth and bearing of said lens to generate maximum heat by the passage of solar rays relative therethrough regardless of the position of the sun relative thereto,
    heat exchanger means upon which the solar rays passing through said lens are directed for heating a fluid therein,
    means for passing a fluid through said heat exchanger means so as to heat the fluid therein, thereby creating an expansible fluid,
    means through which said fluid may be expanded to transfer energy,
    means for converting the energy to electrical energy,
    means for selectively storing at least a portion of the energy in said fluid during periods of less than maximum use thereof, and
    means for selectively storing at least a portion of the electrical energy generated during periods of less than maximum use thereof.
2. The apparatus of claim 1 wherein
    said lens further includes
        means for controlling the chemical composition of said liquid means.
3. The apparatus of claim 2 wherein
    said controlling means comprises
        means for passing an electrical current through said liquid means.
4. The apparatus of claim 1 wherein
    said fluid energy storage means comprises an eutectic.
5. The apparatus of claim 1 wherein
    said passing means includes
        means for pressurizing the fluid to be passed through said heat exchanger.
6. Apparatus for generating electrical current including
    means for capturing solar rays comprising
        a lens having
            a pair of plates having a volume enclosed therebetween,
            means for substantially sealing said volume while allowing for expansion and contraction of said plates as they are heated and cooled by the sun,
            liquid means within said volume, and
            means for passing an electrical current through said liquid means to control the chemical composition of said liquid means,
    means for heating a fluid by means of the solar rays passing through said lens, and
    means for extracting energy from the fluid thus heated and for converting the energy into electrical current.
7. The apparatus of claim 6 including
    means for increasing and decreasing the amount of said liquid means within said volume as said plates expand and contract, and wherein
    said liquid means has an index of refraction substantially equal to that of said plates.
8. The apparatus of claim 6 including
    means for maintaining said lens oriented toward the sun as the sun moves relative to the lens location.
9. Apparatus for generating usable energy from solar energy comprising
    a lens including
        a pair of plates of substantially equal circular peripheries, defining a volume therebetween,
        a liquid in said volume,
        means extending about the peripheries of said plates for retaining the peripheral edges thereof in a substantially constant relationship, for maintaining has been deleted and in its place the focal length of said lens in substantially constant relationship in spite of diametric thermal expansion, and for preventing said liquid from escaping from said volume, and
    means for heating a fluid by means of solar energy passing through said lens.
10. The apparatus of claim 9 wherein
    said liquid has an index of refraction substantially equal to that of at least one of said plates.
11. The apparatus of claim 9 including
    means for increasing and decreasing the amount of said liquid in said volume as said plates expand and contract.
12. The apparatus of claim 9 including
    means for passing an electrical current through said liquid to control the chemical composition thereof.
13. The apparatus of claim 9 including
    means for constantly orienting said lens toward the sun during those hours that the sun can provide solar energy thereto.
14. The apparatus of claim 9 including
    means for storing the heat energy in said fluid and for releasing the stored heat energy at a later time.

* * * * *